United States Patent
Sano

(10) Patent No.: US 8,065,552 B2
(45) Date of Patent: Nov. 22, 2011

(54) CLOCK GENERATION CIRCUIT, RECORDING DEVICE AND CLOCK GENERATION METHOD

(75) Inventor: Tatsushi Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 506 days.

(21) Appl. No.: 12/127,498

(22) Filed: May 27, 2008

(65) Prior Publication Data

US 2009/0009222 A1    Jan. 8, 2009

(30) Foreign Application Priority Data

Jul. 2, 2007 (JP) ................................. 2007-174361

(51) Int. Cl.
*G06F 1/00* (2006.01)
*G11B 7/00* (2006.01)
*H03L 7/06* (2006.01)

(52) U.S. Cl. ..... 713/500; 713/502; 327/156; 369/44.13; 369/44.32; 369/47.31

(58) Field of Classification Search .................. 713/500, 713/502; 369/44.13, 44.32, 47.31; 327/156
See application file for complete search history.

(56) References Cited

U.S. PATENT DOCUMENTS

| | | | |
|---|---|---|---|
| 6,266,318 B1 * | 7/2001 | Honda et al. ............... | 369/275.3 |
| 7,012,865 B2 * | 3/2006 | Deguchi et al. ............. | 369/47.3 |
| 7,145,850 B2 * | 12/2006 | Takumai et al. ........... | 369/47.31 |
| 7,464,285 B2 * | 12/2008 | Linn ............................. | 713/503 |
| 7,804,756 B2 * | 9/2010 | Haddad et al. ............. | 369/59.25 |
| 2003/0081516 A1 | 5/2003 | Takumai et al. | |

FOREIGN PATENT DOCUMENTS

| JP | 11-74875 | 3/1999 |
|---|---|---|
| JP | 2001-14810 | 1/2001 |
| JP | 2003-109319 | 4/2003 |

OTHER PUBLICATIONS

Office Action issued Aug. 30, 2011, in Japanese Patent Application No. 2007-174361.

* cited by examiner

*Primary Examiner* — Brian Misiura
(74) *Attorney, Agent, or Firm* — Oblon, Spivak, McClelland, Maier & Neustadt, L.L.P.

(57) ABSTRACT

A clock generation circuit is provided that multiplies an input signal of a specific frequency by a specific multiplication factor and generates an output clock signal. The clock generation circuit includes a PLL circuit that multiplies the input signal and generates the output clock signal, and a correction circuit that changes the multiplication factor of the PLL circuit. The correction circuit changes the PLL circuit multiplication factor by increasing or decreasing the specific multiplication factor, the change being performed only during a correction interval for each correction cycle, the correction cycle being longer than one cycle of the input signal, and being performed such that a time difference between an input synchronizing signal synchronized with the input signal and an output synchronizing signal synchronized with the output clock signal is reduced. The PLL circuit multiplies the input signal by the changed multiplication factor during the correction interval.

11 Claims, 9 Drawing Sheets

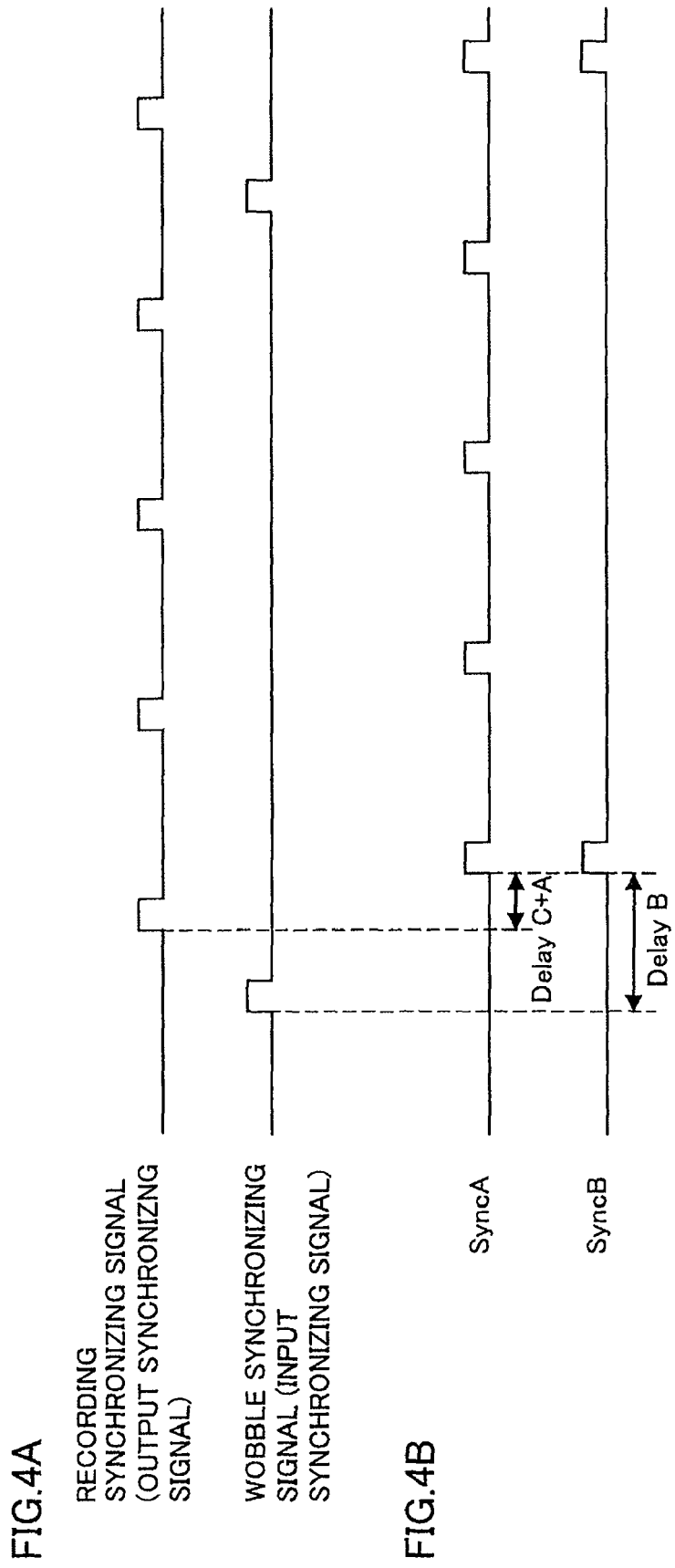

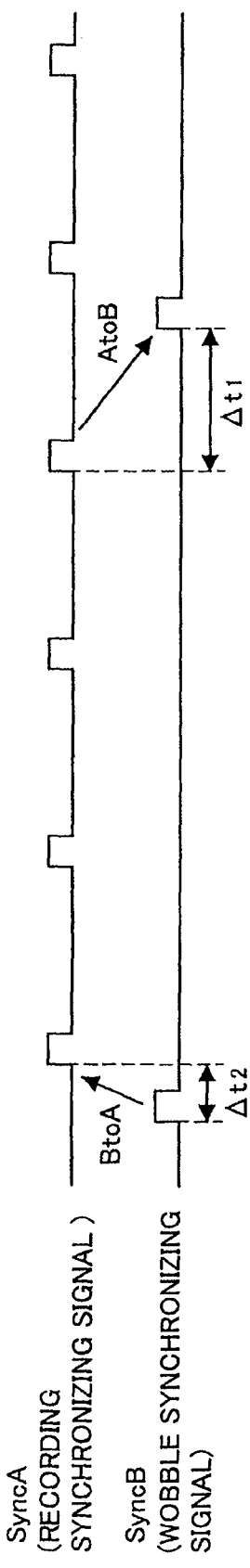
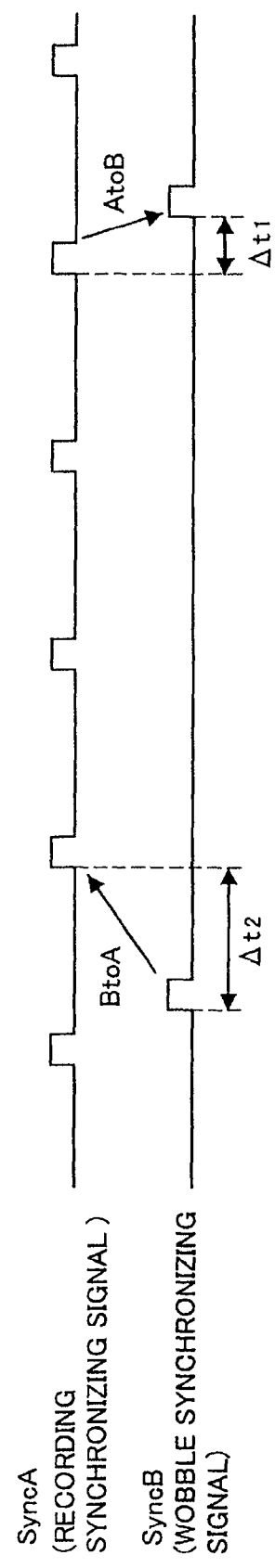
FIG.5A
FIG.5B

CLOCK GENERATION CIRCUIT, RECORDING DEVICE AND CLOCK GENERATION METHOD

CROSS REFERENCES TO RELATED APPLICATION(S)

The present invention contains subject matter related to Japanese Patent Application JP 2007-174361 filed in the Japan Patent Office on Jul. 2, 2007, the entire contents of which being incorporated herein by reference.

BACKGROUND OF THE INVENTION

1. Field of the Invention

The present invention relates to a clock generation circuit, a recording device and a clock generation method.

2. Description of the Related Art

In recent years, recording media such as optical disks that are recordable as well as allowing playback, have grooves formed in advance on the recording surface, and so-called wobble modulation is performed on these grooves to record address data (position data). When recording specific data to be recorded on a recording medium, a recording device extracts the address data as an electric signal (known as a wobble signal), multiplies the signal using a phase-lock loop (PLL) circuit and generates a write clock signal. Then, the recording device uses the write clock signal to write the recording data. At that time, with regard to the recording medium address data, the position to which the recording data is recorded is decided by a format set in advance.

SUMMARY OF THE INVENTION

However, the strength of the wobble signal read by the recording device is sometimes reduced by a manufacturing error in the recording medium, or by contamination of or a flaw in the recording medium, and the signal is sometimes temporarily lost. If the wobble signal is lost in this way, the PLL phase sometimes "slips," meaning the PLL phase is displaced in relation to the recording medium position, the displacement being just the wavelength of the lost wobble signal.

At that time, the recording device starts recording while establishing an interval between a wobble synchronizing signal that is obtained by modulating the wobble signal and a recording synchronizing signal of the recording waveform that is in accordance with an interval of a specific format. However, if the wobble signal strength decreases in the way described above and the wobble synchronizing signal slips, the recording waveform of the recording data to be written is sometimes displaced forward or backward from the address (wobble) that is to be actually recorded. This displacement is called "positional deviation."

When positional deviation occurs, even if writing of the recording data is continued and recording is completed, the recording is not in the correct format, and sometimes the data cannot be read out appropriately.

To prevent this type of failure, known recording devices have performed correction by adding a value to an error value of the PLL circuit in proportion to the positional deviation interval of the wobble synchronizing signal and the recording synchronizing signal.

These known recording devices are effective when the positional deviation interval is within a certain limit. However, when data is recorded over a long period of time, there is an increase in the amount of data temporarily recorded for the purpose of correction or the amount of data for processing, overflow occurs in internal circuits, and the recording device correction circuits exceed internal control limits. Appropriate correction may therefore not be possible.

A recording device that corrects positional deviation by changing a PLL circuit division factor based on a wobble synchronizing signal and a recording synchronizing signal is disclosed, for example, in Japanese Patent Application Publication No. JP-A-2003-109319.

However, the recording device disclosed, for example, in Japanese Patent Application Publication No. JP-A-2003-109319 performs gain multiplication on the positional deviation interval between the wobble synchronizing signal and the recording synchronizing signal, and uses the gain multiplied positional deviation interval as the PLL circuit division factor. Therefore, if the positional deviation interval is large, the amount of change to the division factor may fall outside the PLL circuit capture range (the so-called "PLL lock-in range"), and the PLL circuit output values that fall outside the capture range are sometimes significantly turbulent.

To address this, the present invention appropriately corrects deviation in an output clock signal arising from a lost input signal, and generates an output clock signal that is synchronized with an input signal.

According to an embodiment of the present invention, there is provided a clock generation circuit that includes a PLL circuit that multiplies an input signal of a specific frequency by a specific multiplication factor and generates an output clock signal, and a correction circuit that changes the multiplication factor of the PLL circuit. The correction circuit changes the PLL circuit multiplication factor from the specific multiplication factor to a multiplication factor that is set by increasing or decreasing the specific multiplication factor, the change being performed only during a correction interval for each correction cycle, the correction cycle being longer than one cycle of the input signal, and the change being performed such that a time difference between an input synchronizing signal that is synchronized with the input signal and an output synchronizing signal that is synchronized with the output clock signal is reduced. The PLL circuit multiplies the input signal by the changed multiplication factor during the correction interval.

With this structure, the PLL circuit can generate an output clock signal by multiplying an input signal by a specific multiplication factor. At this time, if there is a time difference between an input synchronizing signal that is synchronized with the input signal and an output synchronizing signal that is synchronized with the output clock signal, the correction circuit changes the PLL circuit multiplication factor from the specific multiplication factor to a multiplication factor that is set by increasing or decreasing the specific multiplication factor, the change being performed only during a correction interval for each correction cycle, and the correction cycle being longer than one cycle of the input signal. In this way, during the correction interval, the PLL circuit can generate an output clock signal by multiplying the input signal by the changed multiplication factor, and during an interval outside the correction interval, the PLL circuit can generate an output clock signal by multiplying the input signal by the specific multiplication factor. By changing the multiplication factor in this way, the time difference between the input synchronizing signal and the output synchronizing signal can be reduced.

The correction circuit may change the PLL circuit multiplication factor from the specific multiplication factor for an exact number of corrections that is determined based on the time difference between the input synchronizing signal and the output synchronizing signal. According to this configuration, the correction circuit uses the time difference between the input synchronizing signal and the output synchronizing signal to determine the number of corrections that is used to change the PLL circuit multiplication factor from the specific multiplication factor to a multiplication factor that is set by increasing or decreasing the specific multiplication factor. Therefore the PLL circuit multiplication factor is changed for the exact number of corrections, and the time difference between the input synchronizing signal and the output synchronizing signal can be reduced.

Also, the correction circuit measures a first time difference from the point in time at which the output synchronizing signal is input to the point in time at which the input synchronizing signal is input, and a second time difference from the point in time at which the input synchronizing signal is input to the point in time at which the output synchronizing signal is input. Then the correction circuit may determine, based on the shorter time difference of the first time difference and the second time difference, the number of corrections that is used to change the PLL circuit multiplication factor from the specific multiplication factor. With this configuration, based on the shorter time difference of the first and the second time difference, the correction circuit can determine the number of corrections. Therefore, the time difference between the input synchronizing signal and the output synchronizing signal can be reduced.

The PLL circuit further includes: an oscillator that oscillates the output clock signal; a frequency divider circuit that divides the output clock signal using a changeable division factor and feeds back a comparison clock signal; a plurality of division factor setting circuits that output differing division factors that set the division factor of the frequency divider circuit; a switch that selects, from the plurality of division factor setting circuits, which one of the division factor setting circuits is connected to the frequency divider circuit; and an oscillation control circuit that controls the phase of the output clock signal that is oscillated by the oscillator such that the phase difference between the input signal and the fed back comparison clock signal is reduced. The correction circuit may switch the switch and change the division factor of the frequency divider circuit such that the multiplication factor of the PLL circuit is changed from the specific multiplication factor. With this configuration, the switch can be switched by the correction circuit and the division factor setting circuit that is connected to the frequency divider circuit can be switched. As a result, the frequency divider circuit division factor is set as the division factor output by the connected division factor setting circuit and in consequence the multiplication factor of the PLL circuit can be changed.

According to another embodiment of the present invention, there is provided a recording device that includes: a PLL circuit that multiplies an input signal of a specific frequency read from a recording medium by a specific multiplication factor and generates a recording clock signal that is used to record recording data onto the recording medium; and a correction circuit that changes the multiplication factor of the PLL circuit. The correction circuit changes the PLL circuit multiplication factor from the specific multiplication factor to a multiplication factor that is established increasing or decreasing the specific multiplication factor, the change being performed only over a correction interval for each correction cycle, the correction cycle being longer than one cycle of the input signal, and the change being performed such that a time difference between an input synchronizing signal that is synchronized with the input signal and a recording synchronizing signal that is repeatedly attached to the recording data at a specific interval is reduced, and the PLL circuit multiplies the input signal by the changed multiplication factor during the correction interval. With this configuration, the time difference between the input synchronizing signal and the output synchronizing signal can be reduced.

According to another embodiment of the present invention, there is provided a clock generation method that includes the steps of: changing a multiplication factor that multiplies an input signal of a specific frequency from a specific multiplication factor to a multiplication factor that is set by increasing or decreasing the specific multiplication factor, the change being performed only during a correction interval for each correction cycle, the correction cycle being longer than one cycle of the input signal, and the change being performed such that a time difference between an input synchronizing signal that is synchronized with the input signal and an output synchronizing signal that is synchronized with an output clock signal is reduced; and generating the output clock signal by multiplying the input signal using the changed multiplication factor during the correction interval. With this configuration, the time difference between the input synchronizing signal and the output synchronizing signal can be reduced.

According to the embodiments of the present invention described above, deviation in the output clock signal occurring due to the lost of the input signal can be appropriately corrected and an output clock signal that is synchronized with the input signal can be generated.

BRIEF DESCRIPTION OF THE DRAWING(S)

FIG. 4A is an explanatory diagram illustrating the operations of the positional deviation interval measuring circuit;

FIG. 4B is an explanatory diagram illustrating the operations of the positional deviation interval measuring circuit;

FIG. 5A is an explanatory diagram illustrating the operations of the positional deviation interval measuring circuit;

FIG. 5B is an explanatory diagram illustrating the operations of the positional deviation interval measuring circuit;

DETAILED DESCRIPTION OF THE PREFERRED EMBODIMENT(S)

Figure 1:
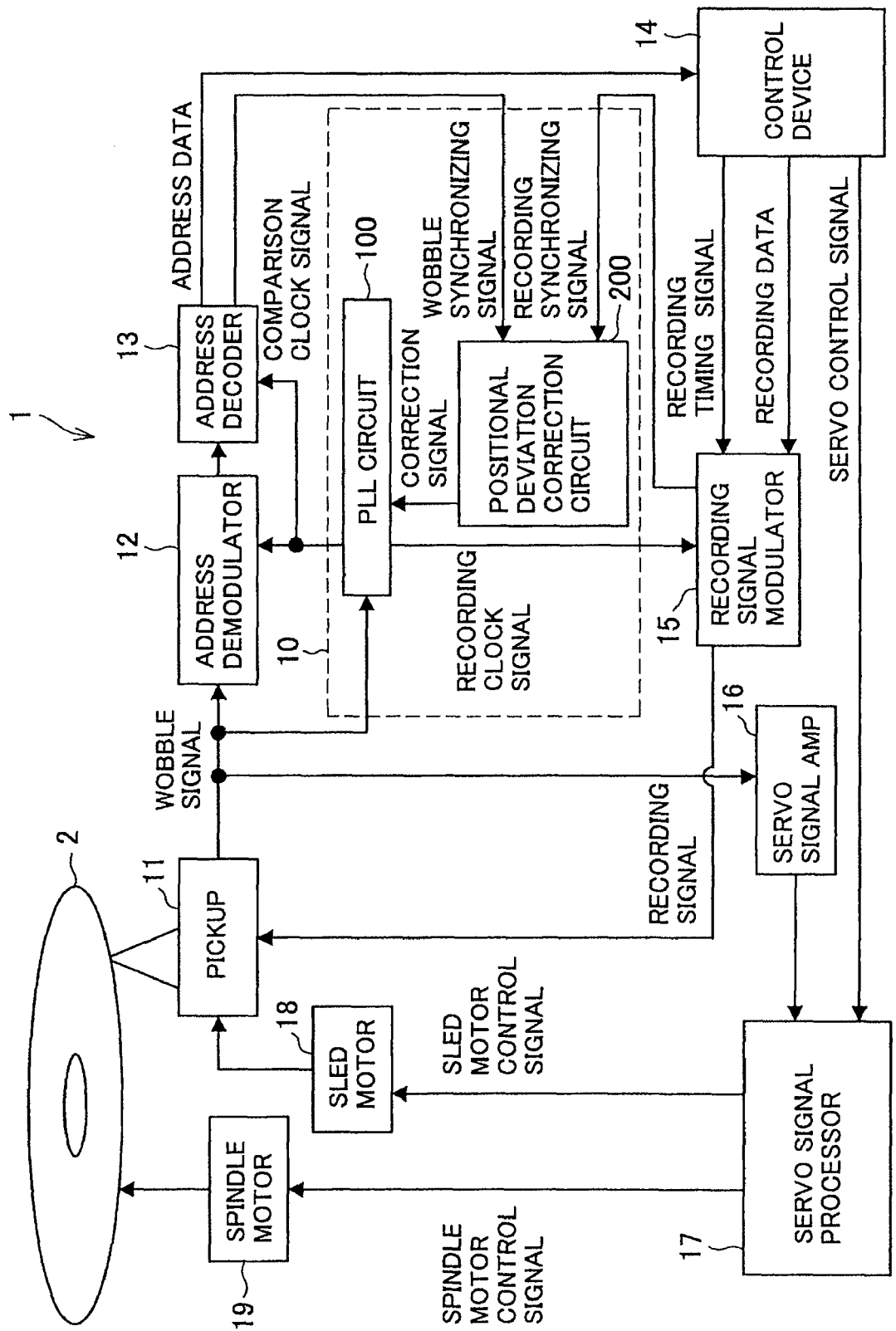
FIG. 1 is an explanatory diagram illustrating the structure of a recording device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Clock Generation Circuits According to Related Technology

Figure 9:
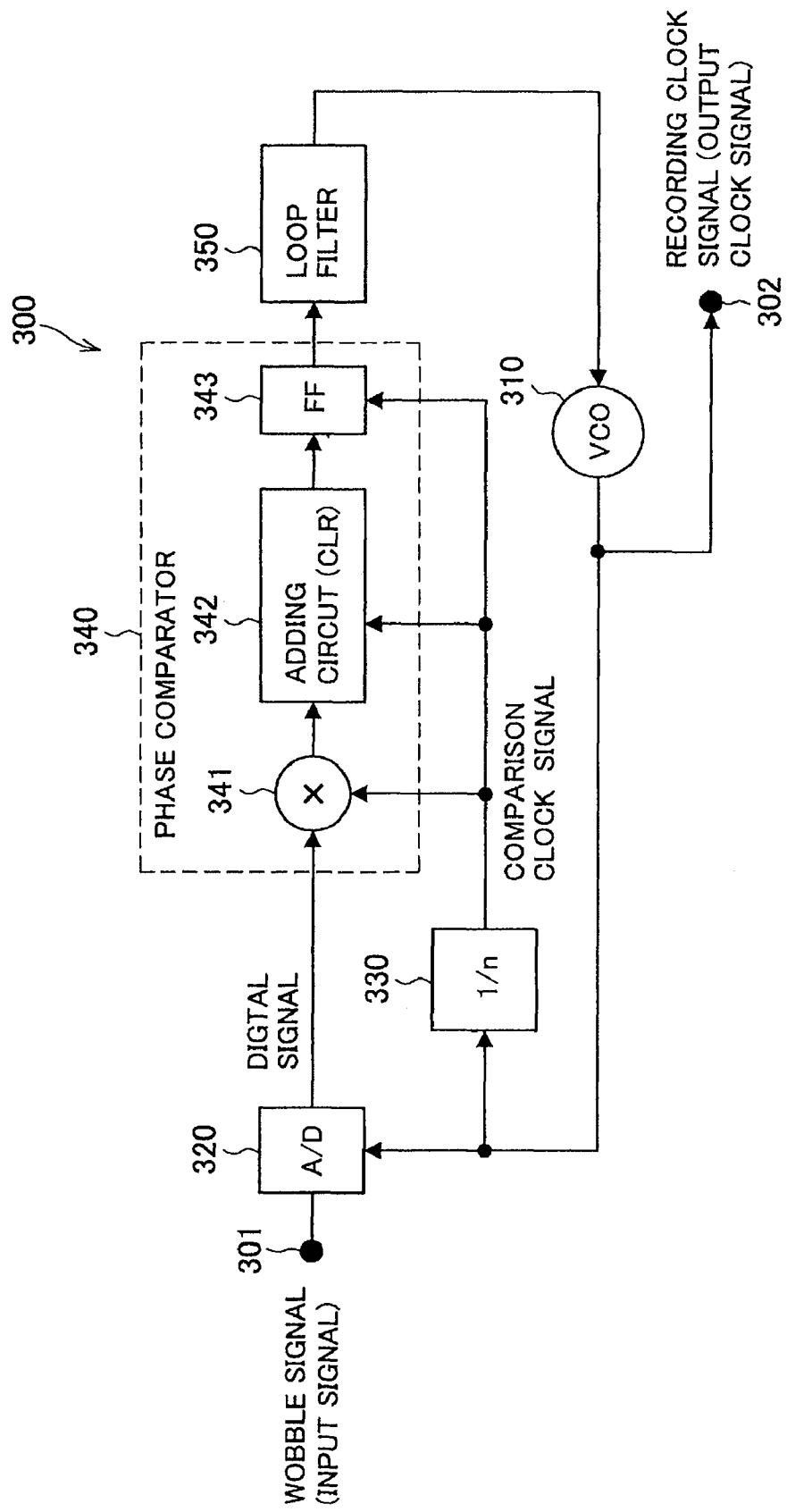
FIG. 9 is a block diagram showing the structure of a clock generation circuit according to related technology.

Before explaining the embodiments of the present invention, a clock generation circuit according to related technology will be explained with reference to FIG. 9. FIG. 9 is a block diagram showing the structure of a clock generation circuit according to related technology.

As shown in FIG. 9, a clock generation circuit 300 according to related technology is formed of a PLL circuit that receives an analog input signal from an input terminal 301, and outputs a recording clock signal from an output terminal 302, the recording clock signal being a multiplied frequency of the input signal. When used in a recording device, a wobble signal is input as the input signal and a recording clock signal is output.

The clock generation circuit 300 according to related technology includes a voltage controlled oscillator (hereinafter sometimes referred to as the "VCO") 310, an A/D converter 320, a frequency divider 330, a phase comparator 340, and a loop filter (hereinafter sometimes referred to as the "LF") 350. The clock generation circuit 300 according to related technology forms a feedback circuit that feeds back output signals.

The VCO 310 is a circuit that oscillates the recording clock signal (the output signal), and the oscillation frequency changes according to the signal (the voltage) input from the phase comparator 340 via the LF 350. For example, the input signal may be an analog circuit that outputs an analog value using a digital analog converter (DAC). The recording clock signal oscillated by the VCO 310 is output as the clock generation circuit 300 output signal, and is output to the A/D converter 320 and the frequency divider 330 at the same time.

The A/D converter 320 uses the recording clock signal oscillated by the VCO 310 as a sampling clock, converts the analog signal input to the clock generation circuit 300 to a digital signal and outputs the digital signal to the phase comparator 340.

The frequency divider 330 receives the recording clock signal oscillated by the VCO 310, divides the signal by n (in other words divides the frequency by 1/n) to create a comparison clock signal, and feeds back the comparison clock signal to a multiplying circuit 341, an adding circuit 342 and a flip-flop (hereinafter sometimes referred to as the "FF") 343 that form part of the phase comparator 340.

The phase comparator 340 outputs as a voltage the phase difference between the input signal converted to a digital signal by the A/D converter 320 and the comparison clock signal fed back by the frequency divider 330, and is a circuit that controls the oscillation frequency of the VCO 310. The phase comparator 340 includes the multiplying circuit 341, the adding circuit 342 and the FF 343.

The multiplying circuit 341 multiplies the input signal from the A/D converter 320 with the comparison clock signal from the frequency divider 330. The multiplying circuit 341 may also be a circuit that first inverts and then outputs the digital signal from the A/D converter 320, when the comparison clock signal from the frequency divider 330 is a binarized value indicating 1 or −1 and the comparison clock signal is −1.

The adding circuit 342 is a circuit that, based on the comparison clock signal from the frequency divider 330, adds the signals output from the multiplying circuit 341 during a comparison interval and outputs the added result. The "comparison interval" here indicates a time interval in which phase comparison is performed by the phase comparator 340. In other words, for example, for phase comparison of one cycle of the input signal (the wobble signal), the comparison interval may be set as one cycle.

For example, when the clock generation circuit 300 multiplies the input signal by n (in other words, an n-fold frequency) and generates the recording clock signal, the adding circuit 342 adds n data.

Based on the comparison clock signal, which is the input signal frequency divided by n and fed back by the frequency divider 330, the FF 343 flip-flop temporarily holds the signal added and output by the adding circuit 342, and then outputs the signal to the LF 350.

The LF 350 is a circuit that smoothes the output signal from the phase comparator 340, namely the signal that is used to control the oscillation frequency of the VCO 310, and outputs the smoothed signal to the VCO 310. The VCO 310 is formed, for example, of an IIR filter or the like.

The clock generation circuit 300 according to related technology that has the above configuration multiplies the input signal and outputs the recording clock signal from the VCO 310. With a recording device according to related technology that includes the clock generation circuit 300, if the input signal (the wobble signal) is temporarily lost due to a reduction in strength caused by a manufacturing error in the recording medium, or by contamination of or a flaw in the recording medium, the PLL phase is displaced in relation to the actual position of the recording medium by exactly the wavelength of the lost wobble signal, resulting in so-called "slip." When this slip occurs, the recording waveform for the recording data to be written is displaced forward or backward from the address (wobble) that is to be actually recorded, and so-called "positional deviation" occurs. When positional deviation occurs, even if the recording data is written and recording is completed, the recording is not in the correct format, and sometimes the data cannot be read out appropriately.

The inventors of this invention have identified and analyzed issue points of the clock generation circuit 300 according to related technology, and have engaged in committed research to create a clock generation circuit that will overcome the issue of known clock generation circuits. The present invention is a result of that research. Below, a clock generation circuit and a recording device using the clock generation circuit according to the embodiments of the present invention will be explained in detail with reference to FIG. 1 to FIG. 8.

Structure of a Recording Device 1

First, the structure of a recording device 1 according to a first embodiment of the present invention will be explained with reference to FIG. 1. FIG. 1 is an explanatory diagram illustrating the structure of the recording device 1 according to the first embodiment of the present invention.

Below, the recording device 1 according to the present embodiment will be explained. The recording device 1 will be explained as a device that records recording data onto a recording medium that is, for example, an optical disk 2 with a specific format. However, the present invention is not limited to the present example, and can be applied to a recording device with any structure as long as the device records recording data onto a recording medium using a recording clock signal that is output by a PLL circuit 100, as explained below.

Grooves are formed in advance on the recording surface of the optical disk 2, which is a single example of the recording media that can be applied to the present invention, and modulation known as a "wobble" is performed on the grooves. Address data for the surface of the optical disk 2 is indicated in the wobble. The recording device 1 according to the present embodiment reads the wobble as a "wobble signal" (an input signal), and multiplies the wobble signal frequency to generate a "recording clock signal" (an output clock signal). Then, the recording device 1 uses the recording clock signal to record the recording data onto the optical disk 2.

For convenience, the following explanation will be made on the assumption that the recording clock signal is generated by multiplying the wobble signal frequency with a multiplication factor of n=16. However, the invention is not limited to this example, and the multiplication factor is decided according to the format etc. of the optical disk 2.

An overview of an example of the structure of the recording device 1 according to the present embodiment will be explained, but it should be noted that the present invention is not limited to the structure explained below.

As shown in FIG. 1, the recording device 1 includes a clock generation circuit 10, a pickup 11, an address demodulator 12, an address decoder 13, a control device 14, a recording signal modulator 15, a servo signal amp 16, a servo signal processor 17, a sled motor 18 and a spindle motor 19.

The pickup 11 irradiates laser light onto the optical disk 2, based on a recording signal output by the recording signal modulator 15. The laser wavelength and spot diameter etc. differ according to the format of the optical disk 2. The pickup 11 then receives the light reflected back from the optical disk 2, converts it to a wobble signal (an electrical signal), and outputs the wobble signal to the clock generation circuit 10, the address demodulator 12 and the servo signal amp 16.

The clock generation circuit 10 receives the wobble signal from the pickup 11, generates a recording clock signal that is synchronized with the wobble signal and outputs the recording clock signal to the recording signal modulator 15. The recording clock signal is used as the clock when the recording device 1 writes recording data onto the optical disk 2.

The clock generation circuit 10 can detect and correct positional deviation caused by loss etc. of the wobble signal. The clock generation circuit 10 will be explained later in more detail.

The clock generation circuit 10 also outputs a comparison clock signal that is synchronized with the wobble signal, for example, a binarized comparison clock signal, to the address demodulator 12 and the address decoder 13. The comparison clock signal is a signal generated by a frequency divider 130 in order to perform phase comparison within the clock generation circuit 10.

Based on the comparison clock signal input from the clock generation circuit 10, the address demodulator 12 demodulates the wobble-modulated signal from the wobble signal and creates a data row, which is then output to the address decoder 13.

Based on the comparison clock signal input from the clock generation circuit 10, the address decoder 13 decodes the data row received from the address demodulator 12 and converts the data row to address data. The address decoder 13 then outputs the address data to the control device 14.

The address decoder 13 also generates a "wobble synchronizing signal (input synchronizing signal)" and outputs the wobble synchronizing signal to the clock generation circuit 10. The wobble synchronizing signal is a signal that is synchronized with the wobble signal and is output repeatedly at a specific cycle of the comparison clock signal. For example, the wobble synchronizing signal may be output at each ADIP unit sync (a period of 56 wobbles; in other words, the signal may be output every 56 wobble signals), or for each ATIP unit sync.

Based on the address data received from the address decoder 13, the control device 14 identifies the position on the surface of the optical disk 2 that is irradiated with laser light by the pickup 11, and, to cause the recording data to be written to the correct position on the optical disk 2, the control device 14 controls the recording signal modulator 15 and the servo signal processor 17. For this, the control device 14 outputs a recording timing signal that is based on the address data and also outputs the recording data that is to be recorded on the optical disk 2 to the recording signal modulator 15. The control device 14 then outputs to the servo signal processor 17 a servo control signal that is based on the address data etc. in order to control the servo signal processor 17.

At this time, the control device 14 may also be connected to an external recording device (not shown in the figures) or an upstream control device (not shown in the figures) or the like, may read out the recording data from the recording device and then output the data, and may output the recording timing signal, the recording data and the servo control signal etc. under the control of the upstream control device or the like.

The recording signal modulator 15 outputs a signal that drives the pickup 11 such that it records the recording data onto the optical disk 2. For this, the recording signal modulator 15 modulates the recording data to a recording signal and outputs the recording signal to the pickup 11. When the pickup 11 receives the recording signal, it irradiates laser light onto the optical disk 2 based on the recording signal.

The recording signal modulator 15 first adds a "recording synchronizing signal" to the recording data before outputting the recording data. At the same time, the recording signal modulator outputs the recording synchronizing signal to the clock generation circuit 10. The recording synchronizing signal is a signal that is synchronized with the recording clock signal and is added repeatedly at a specific cycle of the recording data. For example, the recording synchronizing signal may be added at each frame sync (a period of 28 wobbles; namely the recording synchronizing signal may be added every 28 wobble signals).

Based on the recording timing signal output by the control device 14, the recording signal modulator 15 starts output of the recording signal. In other words, the recording timing signal is a signal that indicates the timing at which recording is to be started. To explain another way, it is the signal that indicates a status where the pickup 11 can irradiate laser light on the address on the optical disk 2 to which the recording data is to be recorded. The recording signal modulator 15 also synchronizes the recording signal with the recording clock signal output by the clock generation circuit 10 and outputs the recording signal.

The servo signal amp 16 amplifies the wobble signal output by the pickup 11 and outputs the amplified signal to the servo signal processor 17.

Based on the wobble signal output by the servo signal amp 16 and the servo control signal output by the control device 14, the servo signal processor 17 controls the rotation of the optical disk 2 and controls the position of the pickup 11. For this, based on the wobble signal and the servo control signal, the servo signal processor 17 outputs a sled motor control signal to the sled motor 18, and outputs a spindle motor control signal to the spindle motor 19.

The sled motor 18 is driven by the sled motor control signal output by the servo signal processor 17 and causes the pickup 11 to move to a specified position.

The spindle motor 19 is driven by the spindle motor control signal output by the servo signal processor 17, and causes the optical disk 2 to rotate. At that time, the spindle motor 19 may, for example, cause the optical disk 2 to rotate at a specific revolution speed for constant angular velocity (CAV) recording, or may cause the revolution speed of the optical disk 2 to be adjusted for constant linear velocity (CLV) recording, using the position of the pickup 11.

This completes the explanation of the structure of the recording device 1. In addition to the structure explained above, the recording device 1 may be provided with various kinds of circuit, such as a tracking or focus adjustment circuit or the like, but a detailed explanation is omitted here. Next, an overview of the recording operations of the recording device 1 of the type of structure described above is explained as follows.

Operations of the Recording Device 1

First, to record specific recording data, the control device 14, via the servo signal processor 17, causes the optical disk 2 to rotate and the pickup 11 to move to a specific position. The control device 14 then, via the recording signal modulator 15, causes the pickup 11 to irradiate specific laser light.

The laser light is irradiated onto the optical disk 2 and reflected back, the reflected light being modulated by the wobble formed in the groove of the optical disk 2. In other words, the reflected light is modulated using the same frequency as the wobble modulation frequency. The pickup 11 then converts the reflected light into a wobble signal (an electrical signal) and outputs the wobble signal.

The address demodulator 12, which receives the wobble signal, and the address decoder 13, which is connected to the address demodulator 12, use the comparison clock signal output by the clock generation circuit 10 and the like to decode the address data from the modulation in the wobble signal, and output the address data to the control device 14. The address data indicates the position on the recording surface of the optical disk 2 at which the pickup 11 can irradiate laser light.

The control device 14 then adjusts the revolution speed of the optical disk 2 and the position of the pickup 11 etc. such that the address data matches the target address at which the specific recording data is to be recorded. Then, if both addresses match, namely, if the pickup 11 has reached the address to which the recording data is to be recorded, the control device 14 outputs the recording timing signal and recording data.

When the recording signal modulator 15 receives the recording timing signal, it modulates the recording data to a recording signal, outputs the recording signal to the pickup 11, and causes the pickup 11 to irradiate laser light such that it writes the recording data. At that time, a recording clock signal is generated from the wobble signal by the clock generation circuit 10. The recording signal modulator 15 synchronizes with the recording clock signal and causes the pickup 11 to write the recording data.

Using the operations explained above, the recording device 1 can cause selected recording data to be recorded to a selected address on the optical disk 2. If the wobble signal is lost due to a manufacturing error in the optical disk 2, or due to contamination of or a flaw in the optical disk 2, the recording clock signal output by the clock generation circuit 10 slips. If the recording clock signal slips, "positional deviation" occurs between the recording signal waveform and the address to which the recording data is to be recorded. However, with the clock generation circuit 10 according to the present embodiment, this type of positional deviation can be detected and corrected. The clock generation circuit 10 according to the present embodiment will now be explained in more detail.

Structure of the Clock Generation Circuit 10

First, the structure of the clock generation circuit 10 of the recording device 1 according to the present embodiment will be explained with reference to FIG. 1 to FIG. 3. As shown in FIG. 1, the clock generation circuit 10 includes a PLL circuit 100 and a positional deviation correction circuit 200.

The PLL circuit 100 multiplies the wobble signal and generates the recording clock signal. The positional deviation correction circuit 200 is an example of a correction circuit. The positional deviation correction circuit 200 detects positional deviation and corrects the positional deviation by changing the multiplication factor of the PLL circuit 100.

The structure of the positional deviation correction circuit 200 of the PLL circuit 100 will be explained with reference to FIG. 2. FIG. 2 is an explanatory diagram of the structure of the clock generation circuit 10 according to the present embodiment.

Structure of the PLL Circuit 100

Figure 2:
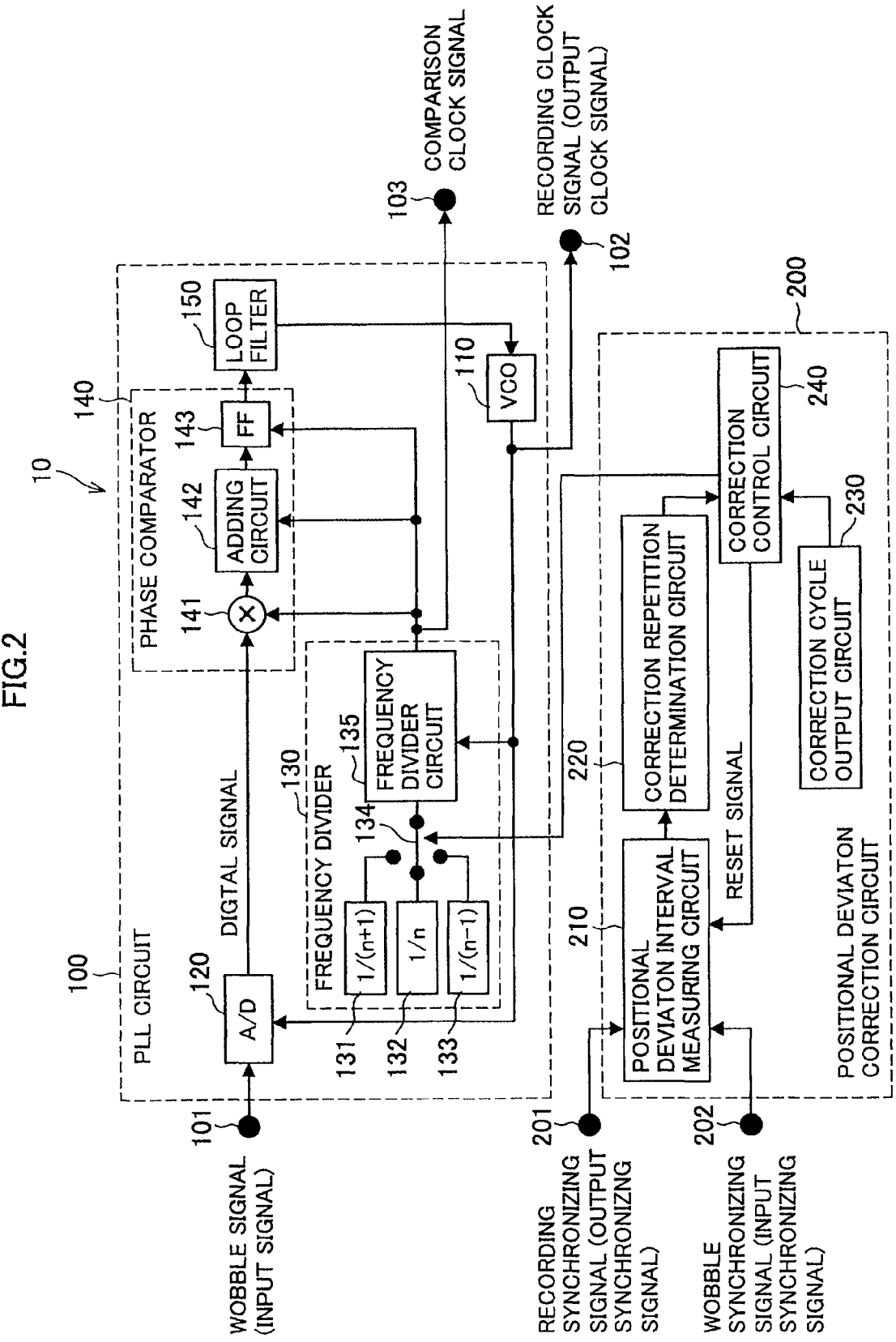
FIG. 2 is an explanatory diagram illustrating the structure of a clock generation circuit according to the first embodiment.

As shown in FIG. 2, the PLL circuit 100 includes a voltage controlled oscillator (hereinafter sometimes also referred to as the "VCO") 110, an A/D converter 120, a frequency divider 130, a phase comparator 140, and a loop filter (hereinafter sometimes also referred to as the "LF") 150. The PLL circuit 100 forms a feedback circuit that feeds back output signals.

In FIG. 2, an input terminal 101 is the terminal that inputs the wobble signal from the pickup 11 in FIG. 1, and an output terminal 102 is connected to the recording signal modulator 15 in FIG. 1, and is the terminal that outputs the recording clock signal. Further, an output terminal 103 is connected to the address demodulator 12 and the address decoder 13 in FIG. 1, and is the terminal that outputs the comparison clock signal.

The VCO 110 is an example of an oscillator that oscillates the recording clock signal, which is the PLL circuit 100 output signal. The VCO 110 changes the recording clock signal oscillation frequency in accordance with the signal (voltage) input from the phase comparator 140 via the LF 150. The VCO 110 can be configured in any manner, as long as the recording clock signal oscillation frequency changes in accordance with the input signal. For example, the VCO 110 may be a digital to analog converter (DAC) analog circuit that outputs the input signal as an analog value. Alternatively, if the signal output by the phase comparator 140 is a current value, the VCO 110 may be configured such that the recording clock signal oscillation frequency changes in accordance with the current value.

The recording clock signal that is oscillated by the VCO 110 is output as the PLL circuit 100 output signal. At the same time, the recording clock signal is output to the A/D converter 120 and the frequency divider 130.

The A/D converter 120 is an example of a converter that uses the recording clock signal oscillated by the VCO 110 as a sampling clock signal, converts the analog wobble signal (hereinafter sometimes also referred to as the "input signal") to a digital signal and outputs the digital signal to the phase comparator 140.

The frequency divider 130 receives and divides the recording clock signal oscillated by the VCO 110, and feeds back the divided signal to the phase comparator 140 as a comparison clock signal. With the recording device 1 according to the present embodiment, the comparison clock signal that is fed back is also output to the address demodulator 12 and the address decoder 13.

The frequency divider 130 is formed of a circuit that can change the frequency division factor from a reference n (in the present embodiment, n=16) using the positional deviation correction circuit 200. In more specific terms, the frequency divider 130 includes three division factor setting circuits 131 to 133, a switch 134 and a frequency divider circuit 135.

The three division factor setting circuits 131 to 133 output differing division factors when the frequency divider circuit 135 counter is zero. The division factor is a frequency setting value that is used to set the division factor of the frequency divider circuit 135. For example, the division factor setting circuit 131 outputs n+1 as the division factor, the division factor setting circuit 132 outputs n as the division factor, and the division factor setting circuit 133 outputs n−1 as the division factor. Of the three division factor setting circuits 131 to 133, the division factor setting circuit 132 is the reference value. The division factor setting circuits need not necessarily be limited to three, and a plurality of division factor setting circuits in excess of three may be provided.

When multiplying the wobble signal by a factor of 16 and generating a recording clock signal, as in the present embodiment, the setting is, for example, n=16.

The positional deviation correction circuit 200 switches the switch 134 and, of the three division factor setting circuits 131 to 133, selects one division factor setting circuit to be connected to the frequency divider circuit 135. In other words, the switch 134 selects, of the division factors (n+1, n, n−1) output by the three division factor setting circuits 131, 132 and 133, which of the division factors is output to the frequency divider circuit 135.

The switch 134 generally connects the reference division factor setting circuit 132 to the frequency divider circuit 135, but temporarily connects the division factor setting circuit 131 or the division factor setting circuit 133 to the frequency divider circuit 135, in accordance with the positional deviation correction circuit 200.

The frequency divider circuit 135 receives and divides the recording clock signal oscillated by the VCO 110, and generates the comparison clock signal. The frequency divider circuit 135 then feeds back the comparison clock signal to the phase comparator 140 and the like. At that time, the frequency divider circuit 135 divides the recording clock signal depending on the division factor selected by the switch 134 from among the division factor setting circuits 131 to 133. More specifically, if the division factor setting circuit 131 is selected, the frequency divider circuit 135 multiplies the recording clock signal frequency by 1/(n+1). If the division factor setting circuit 132 is selected, the frequency divider circuit 135 multiplies the recording clock signal frequency by 1/n, and if the division factor setting circuit 133 is selected, the frequency divider circuit 135 multiplies the recording clock signal frequency by 1/(n−1).

The phase comparator 140 is an example of a phase control device that controls the phase of the recording clock signal output by the VCO 110 such that the phase of the wobble signal that has been converted to a digital signal by the A/D converter 120 matches the phase of the comparison clock signal that has been divided and fed back by the frequency divider 130.

In other words, the phase comparator 140 receives the wobble signal that has been converted to a digital signal by the A/D converter 120, and receives the comparison clock signal divided by n+1, n or n−1 by the frequency divider 130. The phase comparator 140 then outputs a voltage signal to the VCO 110 via the LF 150 such that the phase difference between the wobble signal and the comparison clock signal is reduced to approximately zero.

For this, the phase comparator 140 includes a multiplying circuit 141, an adding circuit 142 and a flip-flop (hereinafter also referred to as the "FF") 143.

The multiplying circuit 141 multiplies the wobble signal from the A/D converter 120 with the comparison clock signal from the frequency divider 130. Also, if the comparison clock signal from the frequency divider 130 is a binarized value indicating 1 or −1, when the comparison clock signal is −1, the multiplying circuit 141 may invert the wobble signal from the A/D converter 120 and output the inverted signal. When the comparison clock signal is 1, the multiplying circuit 141 may output the wobble signal as it is.

The adding circuit 142 is a circuit that, based on the comparison clock signal from the frequency divider 130, adds the signals output from the multiplying circuit 141 during a comparison interval and outputs the added result. The "comparison interval" here refers to the time interval during which phase comparison is performed by the phase comparator 140. When performing phase comparison for the first cycle of the wobble signal (the input signal), for example, the comparison interval may be set as one cycle. Below, where the word "interval" is simply used, this refers to the time interval for one wobble signal cycle.

After the signal is added by the adding circuit 142 based on the comparison clock signal from the frequency divider 130 and output, in order for the resulting signal to be output to the LF 350, the FF 143 temporarily stores the signal.

The LF 150 smoothes the signal output from the phase comparator 140. Namely, the LF 150 is a circuit that smoothes the signal that is used to control the VCO 110 oscillation frequency and outputs the smoothed signal to the VCO 110. The LF 150 may be formed, for example, of an IIR filter.

The PLL circuit 100 with the above configuration outputs the recording clock signal that is synchronized with the wobble signal (in other words, the recording clock signal that is the multiplied wobble signal) from the VCO 110. The multiplication factor is changed by the positional deviation correction circuit 200.

Structure of the Positional Deviation Correction Circuit 200

As shown in FIG. 2, the positional deviation correction circuit 200 includes a positional deviation interval measuring circuit 210, a correction repetition determination circuit 220 that determines the number of corrections performed, a correction cycle output circuit 230 and a correction control circuit 240.

An input terminal 201 in FIG. 2 is connected to the recording signal modulator 15 in FIG. 1, and is the terminal that inputs the recording synchronizing signal (the output synchronizing signal). A terminal 202 is connected to the address decoder 13 in FIG. 1, and is the terminal that inputs the wobble synchronizing signal (the input synchronizing signal).

According to the present embodiment, positional deviation between the recording waveform and the optical disk 2 address can be detected by the interval between the recording synchronizing signal and the wobble synchronizing signal. In other words, the positional deviation can be detected by measuring the time difference between the recording synchronizing signal and the wobble synchronizing signal. The time difference indicates the degree of the positional deviation (hereinafter sometimes referred to as the "positional deviation interval").

The positional deviation interval measuring circuit 210 measures the positional deviation interval by measuring the time difference between the recording synchronizing signal and the wobble synchronizing signal, and outputs the positional deviation interval result to the correction repetition determination circuit 220. At that time, the positional deviation interval measuring circuit 210 can determine whether or not the wobble synchronizing signal is delayed or advanced in relation to the recording synchronizing signal. The positional deviation interval measuring circuit 210 can also be reset by a reset signal from the correction control circuit 240. The configuration of the positional deviation interval measuring circuit 210 will be explained in more detail with reference to FIG. 3.

Figure 3:
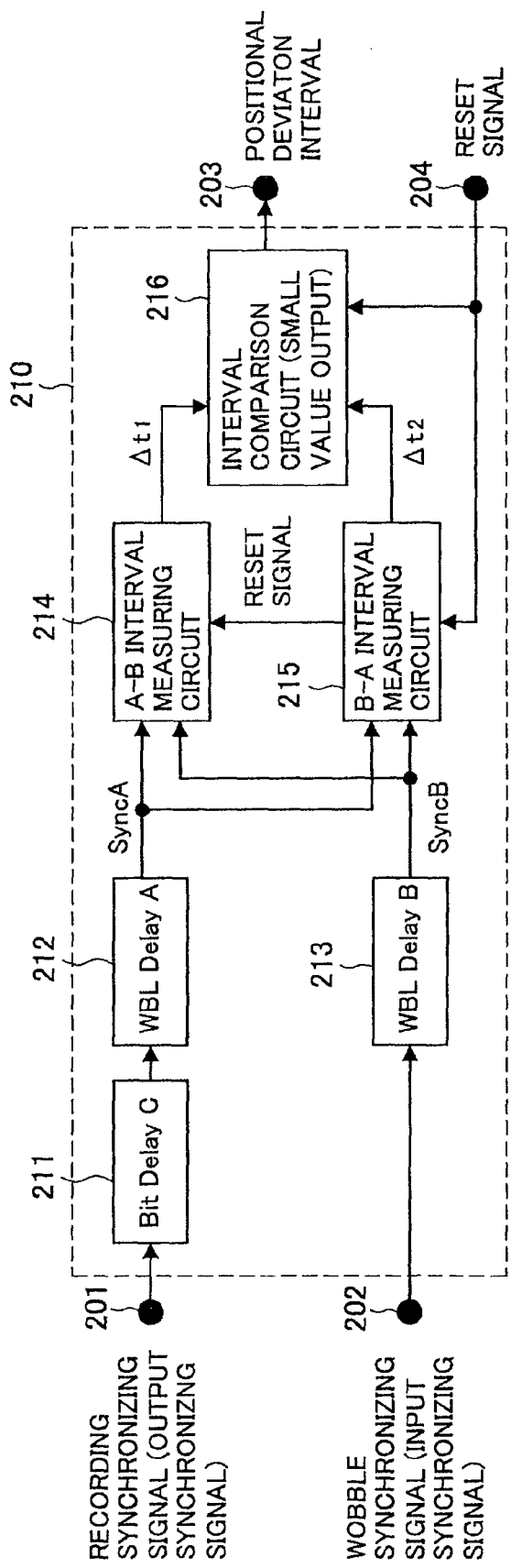
FIG. 3 is an explanatory diagram illustrating a positional deviation interval measuring circuit of the clock generation circuit according to the first embodiment.

FIG. 3 is an explanatory diagram illustrating the positional deviation interval measuring circuit 210 of the clock generation circuit 10 according to the present embodiment. In FIG. 3, an output terminal 203 is connected to the correction repetition determination circuit 220, and is the terminal that outputs the positional deviation interval. A terminal 204 is connected to the correction control circuit 240, and is the terminal that inputs the reset signal to reset the measurement of the positional deviation interval.

As shown in FIG. 3, the positional deviation interval measuring circuit 210 includes delay circuits 211-213, interval measuring circuits 214 and 215, and an interval comparison circuit 216.

The delay circuits 211 to 213 are an example of delay adjusting circuits that adjust the amount of delay of the recording synchronizing signal or the wobble synchronizing signal. The delay circuits 211 to 213 may be formed, for example, of a counter or the like. The recording synchronizing signal and the wobble synchronizing signal, which are respectively generated by analog circuits, demodulator circuits and decoder circuits and the like, are delayed by an amount of delay that is set by the format etc. of the optical disk 2. Therefore, the delay circuits 211 to 213 adjust phase deviation caused by circuit configuration or the like and cause the recording synchronizing signal and the wobble synchronizing signal to have the same phase.

More specifically, the delay circuit 211 delays the recording synchronizing signal by an exact delay amount C. The delay amount C is set in channel clock units, namely in units of one recording clock signal clock.

The delay circuit 212 delays the recording synchronizing signal by an exact delay amount A, and the delay circuit 213 delays the wobble synchronizing signal by an exact delay amount B. The delay amounts A and B are set in the units of comparison of the PLL circuit 100, in other words in units corresponding to one wobble. For example, when n=16, as according to the present embodiment, the delay amounts A and B are set in units of 16 channel clocks (one wobble); for BD, the delay amounts A and B are set in units of 69 channel clocks; and for DVD—the delay amounts A and B are set in units of 186 channel clocks.

Below, for the convenience of explanation, the recording synchronizing signal delayed by the delay circuits 211 and 212 will be referred to as the "Sync A" signal and the wobble synchronizing signal delayed by the delay circuit 213 will be referred to as the "Sync B" signal.

The delay amounts A to C of the delay circuits 211 to 213 are set in advance such that the phase of the Sync A signal matches the phase of the Sync B signal. The delay amounts A to C are decided depending on the circuit configuration, the devices used and the optical disk 2 format and the like.

The interval measuring circuit 214 is the circuit that measures the time interval (the time difference) between the Sync A signal (the recording synchronizing signal) and the Sync B signal (the wobble synchronizing signal). The interval measuring circuit 214 may be formed, for example, of a counter or the like.

More specifically, the interval measuring circuit 214 measures a time interval $\Delta t1$ (a first time difference) that occurs between the time at which the Sync A signal is input and the time at which the Sync B signal is input. If the Sync A signal is input once more before the Sync B signal is input, the interval measuring circuit 214 resets the counter, and can therefore measure the time interval $\Delta t1$ from the most recent Sync A signal to the Sync B signal.

The interval measuring circuit 215 measures a time interval $\Delta t2$ (a second time difference) that occurs between the time at which the Sync B signal is input and the time at which the Sync A signal is input. If the Sync B signal is input once more before the Sync A signal is input, the interval measuring circuit 215 resets the counter, and can therefore measure the time interval $\Delta t2$ from the most recent Sync B signal to the Sync A signal.

By using the interval measuring circuit 214 with this type of configuration, the Sync A signal and the Sync B signal can be made into an interval signal with an integer ratio. For example, the Sync A signal may use frame sync (for example, a 28 wobble unit) and the Sync B signal may use an ADIP unit sync (for example, a 58 wobble unit).

The interval measuring circuits 214 and 215 stop after once measuring the time interval, and output the measured time interval. The interval measuring circuits 214 and 215 also receive a reset signal from the correction control circuit 240, reset the counter, and start measurement once more.

The interval comparison circuit 216 is the circuit that compares the time interval $\Delta t1$ and the time interval $\Delta t2$, selects the smaller value of the two intervals and outputs the smaller value as the positional deviation interval (the correction amount) to the correction repetition determination circuit 220. The interval comparison circuit 216 is formed, for example, of a comparator or the like. The correction direction is also decided depending on the time interval selected by the interval comparison circuit 216. The interval comparison circuit 216 is reset by receiving a reset signal from the correction control circuit 240.

Next, the explanation will return to describe the structure of the positional deviation correction circuit 200 while referring again to FIG. 2, Based on the positional deviation interval output from the positional deviation interval measuring circuit 210, the correction repetition determination circuit 220 determines the number of corrections and the correction direction, and then outputs the number of corrections to the correction control circuit 240.

The number of corrections indicates the number of times that the frequency divider 130 division factor is increased or decreased from n to correct the positional deviation. In other words, the number of corrections indicates the number of times that the division factor is changed by switching the frequency divider 130 switch 134. Therefore, the correction repetition determination circuit 220 may be, for example, an arithmetic circuit that calculates the number of corrections from the positional deviation interval, or may be a circuit that outputs the number of corrections by converting the positional deviation interval to a table.

The correction direction indicates whether, to correct the positional deviation, the frequency divider 130 division factor is increased or decreased from n. Expressed differently, the correction direction indicates whether the switch 134 is switched to the division factor setting circuit 131 or the division factor setting circuit 133, thus indicating whether the division factor is n−1 or n+1. In more specific terms, when, for example, $\Delta t1$ is input, the correction repetition determination circuit 220 may determine that the Sync B signal (the wobble synchronizing signal) is delayed in relation to the Sync A signal (the recording synchronizing signal), and may output a minus direction as the correction direction (the direction in which the division factor is changed from n to n−1). When $\Delta t2$ is input, the correction repetition determination circuit 220 may determine that the Sync B signal (the wobble synchronizing signal) is advanced in relation to the Sync A signal (the recording synchronizing signal), and may output a plus direction as the correction direction (the direction in which the division factor is changed from n to n+1).

The Correction Cycle Output Circuit 230

The correction cycle output circuit 230 stores the "correction cycle" and outputs the correction cycle to the correction control circuit 240. The correction cycle indicates the cycle in which the frequency divider 130 division factor is increased or decreased from n, and serves as a control gain (speed) for the correction. Expressed differently, the correction cycle is the time interval from the point in time at which the switch 134 switches from the division factor setting circuit 132 to the division factor setting circuit 131 or to the division factor setting circuit 133, to the point in time at which the switch 134 next switches from the division factor setting circuit 132 to the division factor setting circuit 131 or to the division factor setting circuit 133.

The correction cycle differs according to the circuit configuration or the optical disk 2 format etc. and is decided by actual measurement values or experiments and the like. The correction cycle is set to be longer than the wobble signal cycle. If the correction cycle is too long, the time taken to correct positional deviation becomes long. If the correction cycle is too short, the time taken to correct positional deviation is short, but the PLL circuit 100 capture range may be displaced, in the same way as if phase shock occurs in the PLL circuit 100. It is therefore preferable to set a suitable correction cycle according to actual measurements and store it in the correction cycle output circuit 230. At that time, it is preferable to set the correction cycle at a control interval that is sufficiently lower than the PLL circuit 100 bandwidth.

The correction control circuit 240 is a circuit that controls the frequency divider 130 division factor, based on the number of corrections and the correction direction received from the correction repetition determination circuit 220, and on the correction cycle received from the correction cycle output circuit 230. More specifically, the correction control circuit 240 temporarily changes the division factor set at n to n+1 or n−1, based on the correction direction. The changes to the division factor are made during an interval based on the correction cycle. The correction control circuit 240 corrects the positional deviation by changing the division factor for exactly the number of corrections. When the division factor is not changed by the correction control circuit 240, the division factor is set as n.

The interval during which switching occurs to change the division factor to n+1 or n−1 and the wobble signal is processed is called the "correction interval." In other words, the correction control circuit 240 temporarily changes the division factor for the correction interval set for each correction cycle. If the circuit is configured so that the division factor is maintained until the frequency divider 130 processes a single wobble signal, the correction interval may be a point in time that has no temporal width.

Further, after changing the division factor for exactly the number of corrections over the correction cycle, the correction control circuit 240 outputs a reset signal to the positional deviation interval measuring circuit 210 and the correction repetition determination circuit 220. The reset signal is an end signal that indicates that correction is complete, and is also a start signal to once more perform a new correction.

This completes the explanation of the structure of the clock generation circuit 10 according to the present embodiment. Next, the operations of the clock generation circuit 10 will be explained.

Operations of the Clock Generation Circuit 10

When a wobble signal is input to the input terminal 101 of the PLL circuit 100 in FIG. 2, the wobble signal is converted to a digital signal by the A/D converter 120 as a sampling clock for the recording clock signal output by the VCO 110. The digitalized wobble signal is then output to the phase comparator 140.

The VCO 110 oscillates the recording clock signal that is synchronized with the wobble signal, and the recording clock signal is divided by the frequency divider 130 and fed back to the phase comparator 140 as a comparison clock signal. At that time, the frequency divider 130 division factor is switched by the positional deviation correction circuit 200 using the switch 134 to select one of the division factor setting circuits 131 to 133, thus setting the division factor to n, n+1 or n−1.

The wobble signal input into the phase comparator 140 is compared to the comparison clock signal fed back by the frequency divider 130. This phase comparison is performed by the multiplying circuit 141 and the adding circuit 142. The role of the FF 143 is to temporarily store the signal output as the phase comparison result, then output the signal to the LF 150.

Then, if there is a phase difference between the wobble signal and the comparison clock signal, the phase comparator 140 outputs a specific signal (here, a voltage value) and controls the phase of the recording clock signal to be oscillated by the VCO 110. In other words, the frequency of the clock signal output by the PLL circuit 100 is decided depending on the size of the phase comparator 140 output value. The role of the LF 150 is to smooth the predetermined signal from the phase comparator 140 and output the smoothed signal to the VCO 110.

Through the above operations, the clock generation circuit 10 can output a comparison clock signal that is synchronized with a wobble signal from the PLL circuit 100. At that time, with the clock generation circuit 10, the positional deviation correction circuit 200 can correct positional deviation and generate the comparison clock signal by changing the PLL circuit 100 multiplication factor (namely, changing the frequency divider 130 division factor).

Here, positional deviation correction by the positional deviation correction circuit 200 will be explained with reference to FIG. 5 to FIG. 8.

Positional Deviation Correction

First, the recording synchronizing signal and wobble synchronizing signal input into the positional deviation interval measuring circuit 210 are respectively delayed by the delay circuits 211 and 212 and by the delay circuit 213 and their phases can be matched. The positional deviation interval measuring circuit 210 will now be explained with reference to FIG. 4A and FIG. 4B.

FIG. 4A and FIG. 4B are explanatory diagrams illustrating the operations of the positional deviation interval measuring circuit 210. FIG. 4A shows the recording synchronizing signal and the wobble synchronizing signal input into the positional deviation interval measuring circuit 210 and FIG. 4B shows the recording synchronizing signal and the wobble synchronizing signal delayed by the delay circuits 211 to 213. In other words, FIG. 4B shows the Sync A signal and the Sync B signal.

The position (timing) of the recording synchronizing signal and the wobble synchronizing signal is decided by the format and so on of the optical disk 2, such as a CD, DVD, BD or the like. For example, when using a Blu-ray™ disc, the wobble synchronizing signal is recorded such that it becomes the recording synchronizing signal after 9.5 wobbles. FIG.

4A shows a format in which the wobble synchronizing signal is advanced in relation to the recording synchronizing signal.

The phase of the recording synchronizing signal and the phase of the wobble synchronizing signal, which depend on the format etc., can be matched, as shown in FIG. 4B, by respectively delaying the signals using the delay circuits 211 to 213. In other words, the recording synchronizing signal is delayed by the delay circuits 211 and 212 by the exact delay amount C+A (the Sync A signal), and the wobble synchronizing signal is delayed by the delay circuit 213 by the exact delay amount B (the Sync B signal). As a result, the delayed Sync A and Sync B signals have the same phase.

However, if the wobble signal is lost and slips, and positional deviation occurs, a time difference occurs between the Sync A signal and the Sync B signal. This time difference is the positional deviation interval. Here, the positional deviation interval measuring circuit 210 next measures the positional deviation interval between the Sync A signal and the Sync B signal. The measurement of the positional deviation interval will be explained with reference to FIG. 5A and FIG. 5B.

FIG. 5A and FIG. 5B are explanatory diagrams illustrating the operations of the positional deviation interval measuring circuit 210. FIG. 5A shows a case of positional deviation in which the Sync B signal (the wobble synchronizing signal) is advanced in relation to the Sync A signal (the recording synchronizing signal). FIG. 5B shows a case of positional deviation in which the Sync B signal is delayed in relation to the Sync A signal.

As shown in FIG. 5A and FIG. 5B, the time interval $\Delta t1$ (the first time interval) from the input of the Sync A signal to the input of the Sync B signal is measured by the interval measuring circuit 214, and the time interval $\Delta t2$ (the second time interval) from the input of the Sync B signal to the input of the Sync A signal is measured by the interval measuring circuit 215.

Then, the smaller of the two values $\Delta t1$ and $\Delta t2$ is output by the interval comparison circuit 216 as the positional deviation interval. For example, in the case shown in FIG. 5A, $\Delta t2$ is smaller than $\Delta t1$, so $\Delta t2$ is output as the positional deviation interval. $\Delta t2$ indicates that the Sync B signal (the wobble synchronizing signal) is advanced in relation to the Sync A signal (the recording synchronizing signal).

On the other hand, in the case shown in FIG. 5B, $\Delta t1$ is smaller than $\Delta t2$ and so $\Delta t1$ is output as the positional deviation interval. $\Delta t1$ indicates that the Sync B signal (the wobble synchronizing signal) is delayed in relation to the Sync A signal (the recording synchronizing signal).

In this way, the positional deviation interval measuring circuit 210 according to the present embodiment can measure the positional deviation interval, and also determine the direction of the positional deviation (the correction direction), namely determine whether the Sync B signal is advanced or delayed in relation to the Sync A signal.

Next, the positional deviation interval is output to the correction repetition determination circuit 220, and the correction repetition determination circuit 220 uses the positional deviation interval to determine the number of corrections and the correction direction. The correction repetition determination circuit 220 then outputs the number of corrections and the correction direction to the correction control circuit 240.

Figure 6:
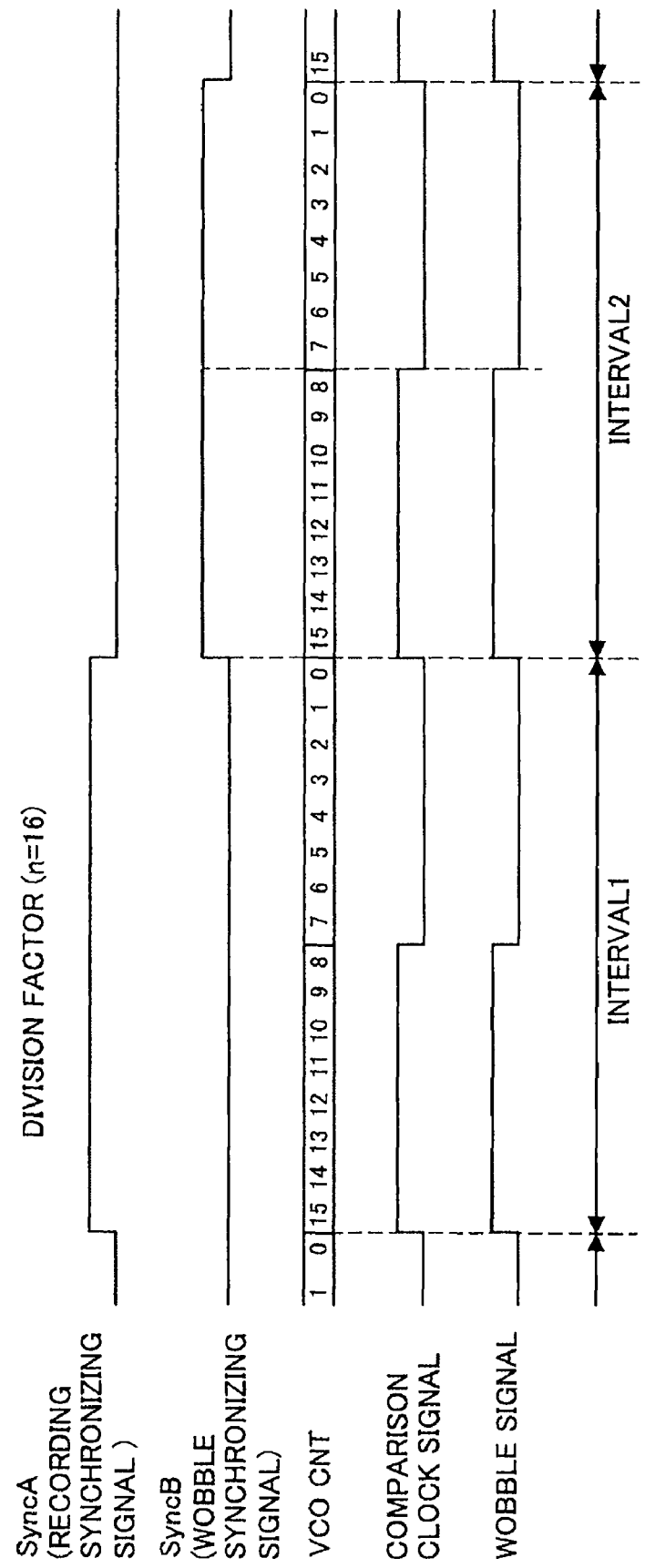
FIG. 6 is an explanatory diagram illustrating the operations of the clock generation circuit according to the first embodiment.
Figure 7:
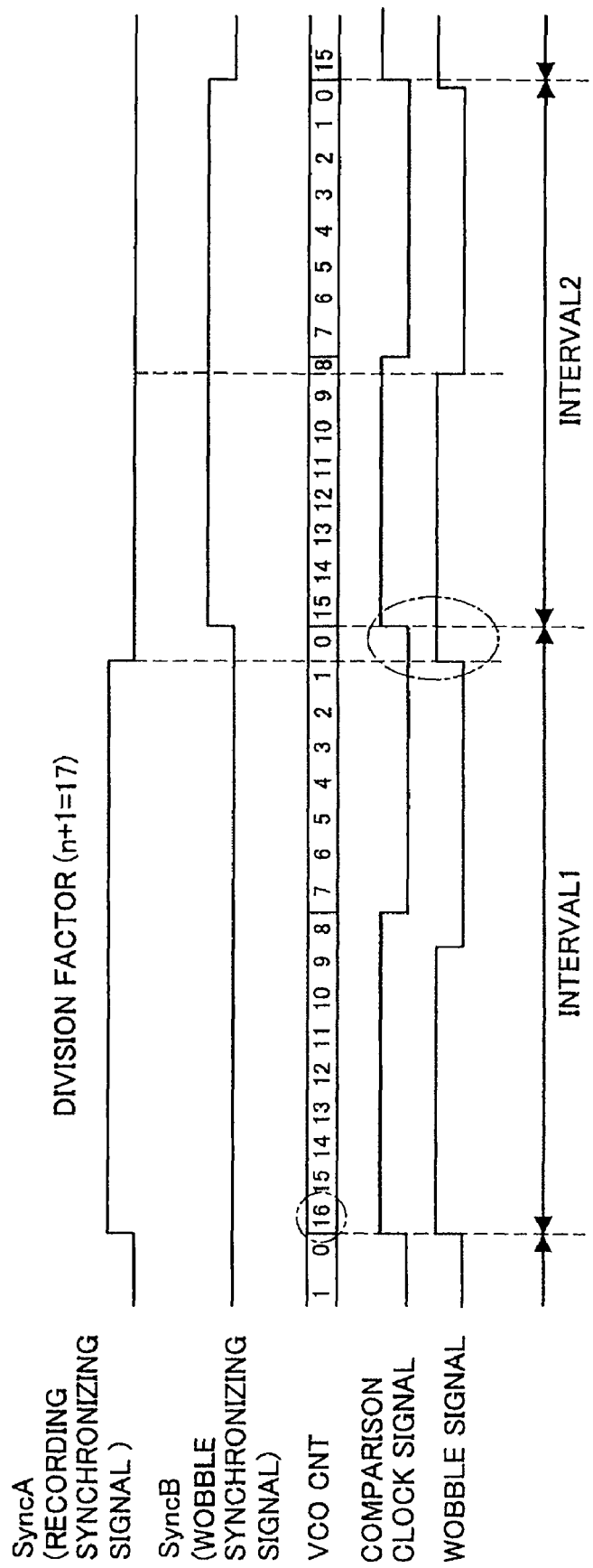
FIG. 7 is an explanatory diagram illustrating the operations of the clock generation circuit according to the first embodiment.

The correction control circuit 240 then corrects the positional deviation by switching the frequency divider 130 switch 134 in the correction direction for the number of corrections, over the correction interval of the correction cycle received from the correction cycle output circuit 230. The correction of the positional deviation by the switching of the switch 134 will be explained with reference to FIG. 6 to FIG. 8. FIG. 6 and FIG. 7 are explanatory diagrams illustrating the operations of the clock generation circuit 10 according to the present embodiment.

FIG. 6 shows a case in which the wobble synchronizing signal (the Sync B signal) is delayed by 1 wobble signal in relation to the recording synchronizing signal (the Sync A signal).

FIG. 6 shows the recording synchronizing signal (the Sync A signal), the wobble synchronizing signal (the Sync B signal), VCO counts (VCO CNT), the comparison clock signal and the wobble signal timing along a horizontal time axis. The VCO CNT indicates the count number for the comparison clock signal that is frequency-divided by the frequency divider 130. The axes here are the same in FIG. 7 and FIG. 8.

As shown in FIG. 6, when the division factor n=16, the recording clock signal is obtained by dividing the VCO CNT frequency by 16, and the comparison clock signal is therefore the same as the wobble signal. The wobble synchronizing signal is synchronized with the comparison clock signal and then output, so when the division factor is set as 16, the wobble synchronizing signal (the Sync A signal) delay is not corrected.

From the situation shown in FIG. 6, FIG. 7 shows a case in which the positional deviation correction circuit 200 changes the division factor to n+1=17 for an interval 1 that corresponds to the correction interval.

As shown in FIG. 7, by changing the division factor to 17, the comparison clock signal obtained by frequency-dividing the VCO CNT by 17 is delayed by exactly one VCO CNT clock in relation to the wobble signal in an interval 2. Therefore, the wobble synchronizing signal output by wobble signal synchronization based on the delayed comparison clock signal is delayed by exactly one VCO CNT clock. In other words, by setting the division factor to +1, the wobble synchronizing signal can be delayed in relation to the recording synchronizing signal and the recording signal can be advanced in relation to the wobble.

Figure 8:
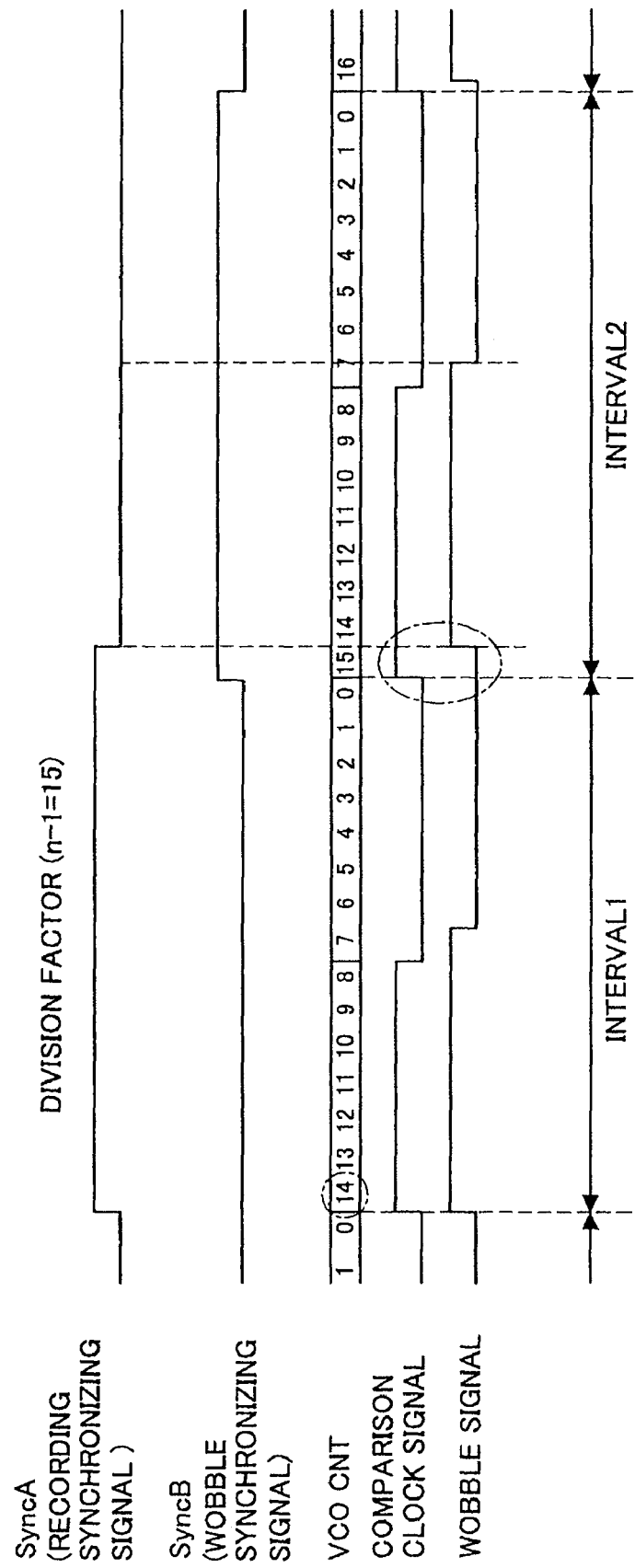
FIG. 8 is an explanatory diagram illustrating the operations of the clock generation circuit according to the first embodiment.

From the situation shown in FIG. 6, FIG. 8 shows a case in which the positional deviation correction circuit 200 changes the division factor to n−1=15 for the interval 1 that corresponds to the correction interval.

As shown in FIG. 8, by changing the division factor to 15, the comparison clock signal obtained by frequency-dividing the VCO CNT by 15 is advanced by exactly one VCO CNT clock in relation to the wobble signal in the interval 2. Therefore, the wobble synchronizing signal output by wobble signal synchronization based on the advanced comparison clock signal is advanced by exactly one VCO CNT clock. In other words, by setting the division factor to −1, the wobble synchronizing signal can be advanced in relation to the recording synchronizing signal and the recording signal can be delayed in relation to the wobble.

In the interval 2 shown in FIG. 7 and in FIG. 8, the division factor is returned to the reference division factor of 16. Therefore, the phase of the comparison clock signal that is delayed or advanced by exactly one VCO CNT clock in relation to the wobble signal is changed by the actions of the phase comparator 140 to gradually match the phase of the wobble signal.

As explained above, by changing the division factor, positional deviation can be corrected one VCO CNT clock at a time. Positional deviation can be corrected by changes to the division factor that are performed for the positional deviation interval only, in other words, by changes that are performed 16 times in the above example. The positional deviation correction circuit 200 operates in the specific manner explained below.

As shown in FIG. 5B, when the positional deviation interval measuring circuit 210 outputs Δt1 as the positional deviation interval (in other words, when the wobble synchronizing signal is delayed in relation to the recording synchronizing signal), the correction repetition determination circuit 220 outputs the number of corrections corresponding to the interval Δt1 to the correction control circuit 240. The interval Δt1 may be converted to a VCO CNT clock count and output as the number of corrections, and a number larger than the number obtained from the converted clock count may also be output.

Statistically, positional deviation resulting from the loss of the wobble signal may be repeated. Therefore, positional deviation may occur even during the time in which positional deviation is being corrected. Giving statistical consideration to an interval during which positional deviation is repeated, positional deviation can be suitably corrected by the output of a number that is larger than the number obtained by converting the VCO CNT clock count, as described above.

The correction repetition determination circuit 220 also determines from the interval Δt1 that the wobble synchronizing signal is delayed in relation to the recording synchronizing signal, and determines the correction direction in the direction that will advance the wobble synchronizing signal in relation to the recording synchronizing signal. The correction repetition determination circuit 220 outputs both the number of corrections and the correction direction to the correction control circuit 240. Specifically, the correction direction in this case is indicated by the switch 134 selecting the division factor setting circuit 133 (the division factor n−1) for the correction interval, namely by setting the division factor to minus.

The correction control circuit 240 then switches the switch 134 for the correction direction of the correction interval set for each correction cycle output by the correction cycle output circuit 230. Further, the correction control circuit 240 corrects the positional deviation by switching the switch 134 for the number of corrections exactly. Also, the correction control circuit 240, after correcting the positional deviation, outputs the reset signal and starts the next positional deviation correction.

When the positional deviation interval measuring circuit 210 outputs Δt2 as the positional deviation interval (in other words, when the wobble synchronizing signal is advanced in relation to the recording synchronizing signal), the operations of the correction repetition determination circuit 220 are the same in principle to the operations described above, except that the correction direction is determined by causing the switch 134 to select the division factor setting circuit 131 (division factor n+1) for the correction interval, and that the number of corrections is determined based on the interval Δt2. A further explanation of the operation of the correction repetition determination circuit 220 is therefore omitted here.

This completes the explanation of the clock generation circuit 10 according to the present embodiment, and of the recording device 1 that includes the clock generation circuit 10. With the clock generation circuit 10, by changing the multiplication factor (division factor) of the PLL circuit 100, positional deviation between a wobble synchronizing signal and a recording synchronizing signal can be appropriately corrected.

The changing of the division factor is performed by temporarily changing the division factor from a reference value n over a correction interval set for each correction cycle, the correction cycle being longer than the wobble signal cycle. Therefore, the comparison clock signal and the like do not fall outside the PLL circuit 100 capture range, and positional deviation can be corrected. Further, the number of corrections (the number of times the division factor is changed) is determined based on the time difference between the wobble synchronizing signal and the recording synchronizing signal. In other words, the number of corrections is determined based on the positional deviation interval, and the positional deviation can therefore be corrected.

With the recording device 1 that includes the clock generation circuit 10, even if the PLL circuit 100 slips during recording, as the clock generation circuit 10 corrects the positional deviation resulting from the slip, it is possible to gradually return to the correct recording position and complete the recording. Therefore, recording that does not conform to the optical disk 2 format can be prevented, and the next recording can be started from the correct position.

Further, as recording is performed in the correct position, deterioration in the recording capacity of the optical disk 2 as a result of slip etc. can be avoided. The required manufacturing tolerances for the pickup 11 etc. to prevent loss of the wobble signal can be relaxed, and the required accuracy when adjusting the characteristics between each component can also be relaxed. As a result, mass productivity can be improved, and yield can be increased.

Even if fluctuations occur in the wobble signal, it can be sufficiently demodulated, and the correct address can be read out. Therefore, unnecessary time taken to identify the correct address data can be reduced, and stable recording can be achieved, even on recording media with large variations in quality.

It should be understood by those skilled in the art that various modifications, combinations, sub-combinations and alterations may occur depending on design requirements and other factors insofar as they are within the scope of the appended claims or the equivalents thereof.

For example, in the above described embodiments, the configuration of the frequency divider 130 is described as including three division factor setting circuits 131 to 133 that are used by the positional deviation correction circuit 200 to change the division factor from n to n+1 or to n−1. However, the present invention is not limited to this example. The frequency divider 130 may, for example, be configured to change from the standard value n to n±2, or n±3 etc., or be configured to perform changes in a combination of the above.

Further, in the above described embodiments, the frequency divider 130 is described as including the division factor setting circuits 131 to 133, the switch 134 and the frequency divider circuit 135, but the present invention is not limited to this example. For example, the frequency divider 130 may be formed by a counter circuit or the like that changes the division factor to plus or minus by changing the number at which a count value is reset.

The PLL circuit 100 explained in the above-described embodiments is configured as a digital PLL circuit, but the present invention is not limited to this example. The PLL circuit may be, for example, an analog PLL circuit.

In the above-described embodiments, the positional deviation correction circuit 200 is provided with a correction repetition determination circuit 220, but the present invention is not limited to this example. For example, if the positional deviation interval output by the positional deviation interval measuring circuit 210 has a 1:1 correspondence to the number of corrections, the positional deviation correction circuit 200 need not necessarily be provided with the correction repetition determination circuit 220.

What is claimed is:

1. A clock generation circuit comprising:
a phase locked loop (PLL) circuit that multiplies an input signal of a specific frequency by a specific multiplication factor and generates an output clock signal; and
a correction circuit that changes a multiplication factor of the PLL circuit; wherein
the correction circuit changes the multiplication factor of the PLL circuit from the specific multiplication factor to a multiplication factor that is set by increasing or decreasing the specific multiplication factor, the change being performed only once during a correction interval for each correction cycle, the length of each correction cycle being longer than one period of the input signal, and the change being performed such that a time difference between an input synchronizing signal that is synchronized with the input signal and an output synchronizing signal that is synchronized with the output clock signal is reduced, and
the PLL circuit multiplies the input signal by the changed multiplication factor during the correction interval.

2. The clock generation circuit according to claim 1, wherein
the correction circuit changes the multiplication factor of the PLL circuit from the specific multiplication factor for an exact number of corrections that is determined based on the time difference between the input synchronizing signal and the output synchronizing signal.

3. The clock generation circuit according to claim 2, wherein
the correction circuit measures a first time difference from a point in time at which the output synchronizing signal is input to a point in time at which the input synchronizing signal is input, and a second time difference from a point in time at which the input synchronizing signal is input to a point in time at which the output synchronizing signal is input, and
the correction circuit determines, based on the shorter time difference of the first time difference and the second time difference, the exact number of corrections that is used to change the multiplication factor of the PLL circuit from the specific multiplication factor.

4. The clock generation circuit according to claim 1, wherein the PLL circuit further comprises:
an oscillator that oscillates the output clock signal;
a frequency divider circuit that divides the output clock signal using a changeable division factor and feeds back a comparison clock signal;
a plurality of division factor setting circuits that output differing division factors that set a division factor of the frequency divider circuit;
a switch that selects, from the plurality of division factor setting circuits, a division factor setting circuit that is connected to the frequency divider circuit; and
an oscillation control circuit that controls a phase of the output clock signal that is oscillated by the oscillator such that a phase difference between the input signal and the fed back comparison clock signal is reduced, wherein
the correction circuit switches the switch and changes the division factor of the frequency divider circuit such that the multiplication factor of the PLL circuit is changed from the specific multiplication factor.

5. A recording device comprising:
a phase locked loop (PLL) circuit that multiplies an input signal of a specific frequency read from a recording medium by a specific multiplication factor and generates a recording clock signal that is used to record recording data onto the recording medium; and
a correction circuit that changes a multiplication factor of the PLL circuit, wherein
the correction circuit changes the multiplication factor of the PLL circuit from the specific multiplication factor to a multiplication factor that is set by increasing or decreasing the specific multiplication factor, the change being performed only once over a correction interval for each correction cycle, each correction cycle being longer than one cycle of the input signal, and the change being performed such that a time difference between an input synchronizing signal that is synchronized with the input signal and a recording synchronizing signal that is repeatedly attached to the recording data at a specific interval is reduced,
the PLL circuit multiplies the input signal by the changed multiplication factor during the correction interval, and
the correction circuit changes the multiplication factor of the PLL circuit from the specific multiplication factor for an exact number of corrections that is determined based on the time difference between the input synchronizing signal and the output synchronizing signal.

6. A clock generation method comprising the steps of:
changing a multiplication factor that multiplies an input signal of a specific frequency from a specific multiplication factor to a multiplication factor that is set by increasing or decreasing the specific multiplication factor, the change being performed only once during a correction interval for each correction cycle, the length of each correction cycle being longer than one period of the input signal, and the change being performed such that a time difference between an input synchronizing signal that is synchronized with the input signal and an output synchronizing signal that is synchronized with an output clock signal is reduced; and
generating the output clock signal by multiplying the input signal using the changed multiplication factor during the correction interval.

7. The clock generation circuit according to claim 5, wherein
the correction circuit measures a first time difference from a point in time at which the output synchronizing signal is input to a point in time at which the input synchronizing signal is input, and a second time difference from a point in time at which the input synchronizing signal is input to a point in time at which the output synchronizing signal is input, and
the correction circuit determines, based on the shorter time difference of the first time difference and the second time difference, the exact number of corrections that is used to change the multiplication factor of the PLL circuit from the specific multiplication factor.

8. The clock generation circuit according to claim 6, wherein
the correction circuit changes the multiplication factor of the PLL circuit from the specific multiplication factor for an exact number of corrections that is determined based on the time difference between the input synchronizing signal and the output synchronizing signal.

9. The clock generation circuit according to claim 8, wherein
the correction circuit measures a first time difference from a point in time at which the output synchronizing signal is input to a point in time at which the input synchronizing signal is input, and a second time difference from a point in time at which the input synchronizing signal is input to a point in time at which the output synchronizing signal is input, and the correction circuit determines, based on the shorter time difference of the first time difference and the second time difference, the exact number of corrections that is used to change the multiplication factor of the PLL circuit from the specific multiplication factor.

10. The clock generation circuit according to claim 1, wherein changing the multiplication factor of the PLL circuit corrects a positional deviation detected by the correction circuit.

11. The clock generation circuit according to claim 1, wherein the correction circuit includes a plurality of delay circuits, each of the plurality of delay circuits delaying the input synchronizing signal by a different amount.

* * * * *